Sept. 3, 1957  M. KAUFMAN  2,805,096
BALED HAY FORK
Filed May 7, 1956  2 Sheets-Sheet 1
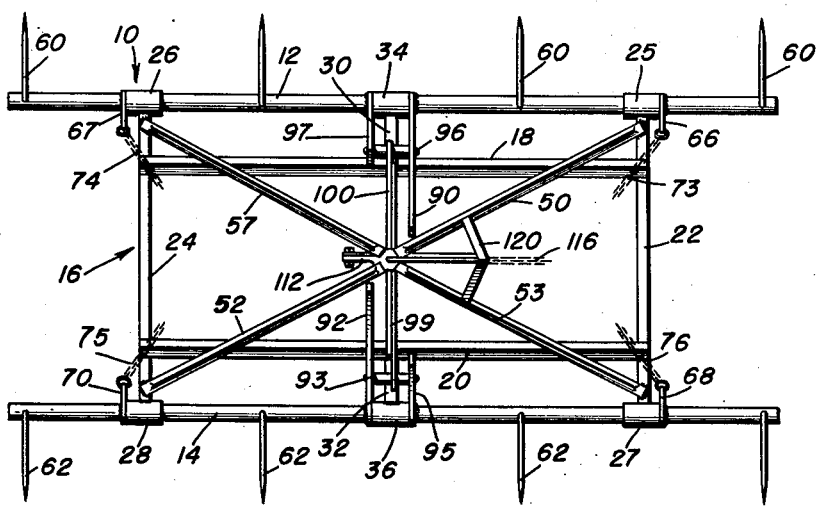
Fig. 1
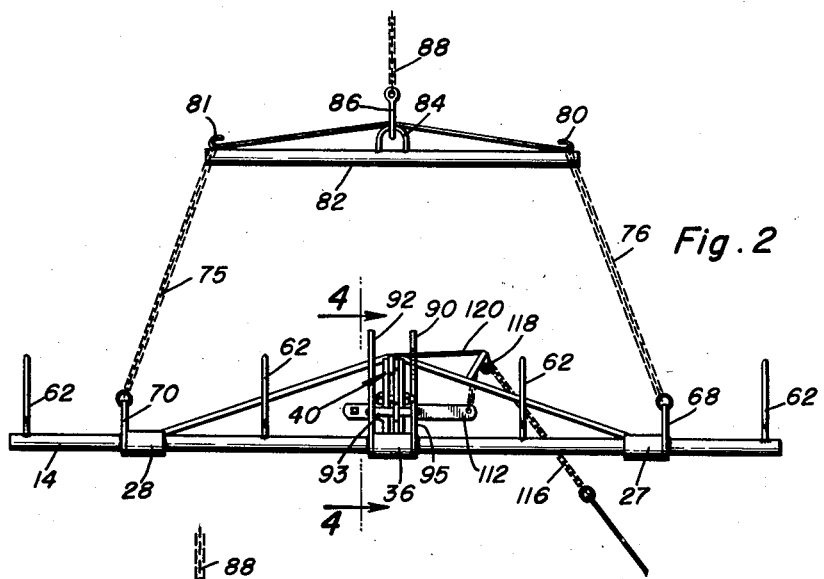
Fig. 2
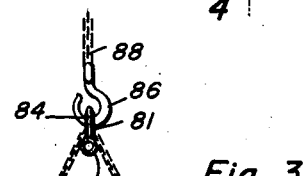
Fig. 3
Marvin Kaufman
INVENTOR.
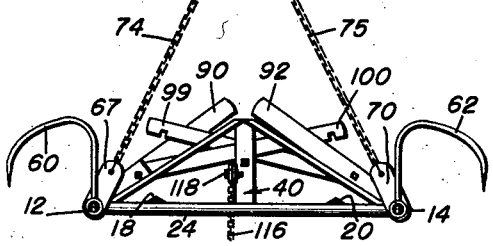

Sept. 3, 1957 M. KAUFMAN 2,805,096
BALED HAY FORK
Filed May 7, 1956 2 Sheets-Sheet 2
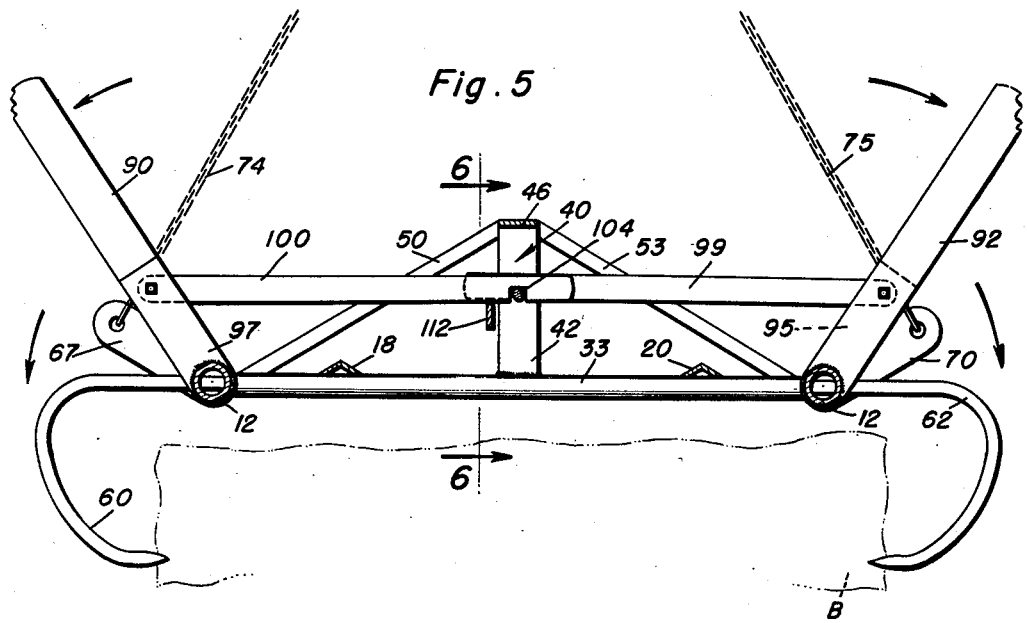
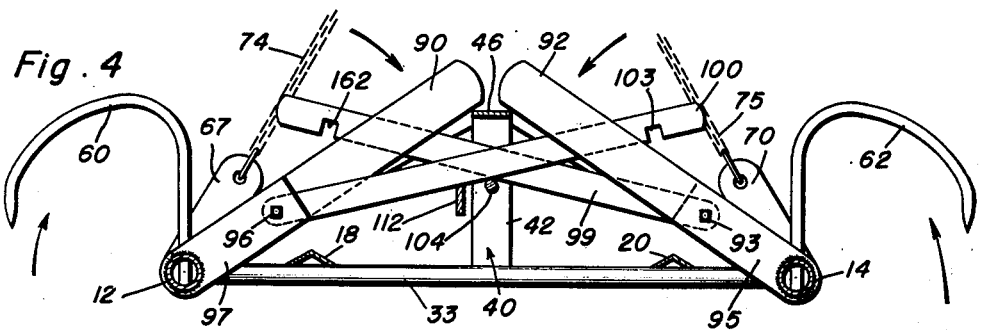
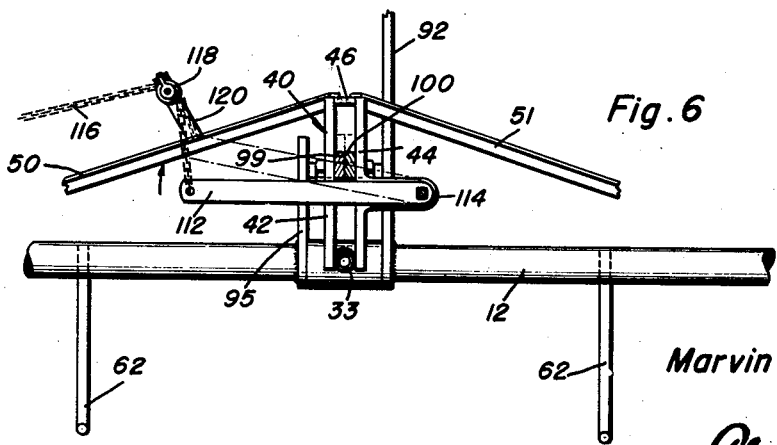
Marvin Kaufman
INVENTOR.

United States Patent Office 2,805,096
Patented Sept. 3, 1957

2,805,096

BALED HAY FORK

Marvin Kaufman, Lindstrom, Minn.

Application May 7, 1956, Serial No. 583,207

10 Claims. (Cl. 294—109)

This invention relates to load handling devices and more particularly to a fork for the handling of baled hay or straw.

An object of the present invention is to provide a quickly operative and smoothly actuating fork which is of simple mechanical construction and which is capable of engaging and securely holding onto a bale in response to a simple manual lever operation and which also automatically releases the bale in response to an equally simple mechanical operation, the weight of the bale and the fork being used to facilitate the opening of the fork so that the bale drops therefrom.

A further object of the invention is to provide a fork of the type which is used to handle bales of hay, straw or other material, for example cotton, the fork having a pair of oscillatable supports that are mounted in laterally located bearings on a frame, these supports having tines, pairs of brackets from which the fork is hung and setting levers that are utilized for the purpose of manually engaging the fork tines with the bales.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of the fork that has been made in accordance with the principles of the invention, parts being broken away to illustrate what would otherwise be hidden detail of construction;

Figure 2 is an elevational view of the device in Figure 1;

Figure 3 is an end view of the device in Figure 2;

Figure 4 is an enlarged sectional view taken on the line 4—4 of Figure 2;

Figure 5 is a view similar to that in Figure 4 but showing the fork in a second position; and Figure 6 is a sectional view taken approximately on the line 6—6 of Figure 5.

Fork 10 which is made in accordance with the principles of the invention comprises a pair of elongated supports 12 and 14, each support being made of pipe or an equivalent. Central frame 16 is made of two elongated angles 18 and 20 that are held parallel to each other and welded or otherwise fixed at their opposite ends to shorter cross members 22 and 24. This means that the frame 16 is approximately rectangular with the extremities of the shorter cross arms 22 and 24 protruding laterally beyond the angles 18 and 20. The purpose for this is to support bearings 25 and 26 on one side of frame 16 and bearings 27 and 28 on the opposite side of the frame. Short lengths of pipe 30 and 32 are fixed to the angle members 18 and 20 intermediate the ends thereof and they support bearings 34 and 36 which are welded thereto or otherwise attached. Bearings 25, 34 and 26 are in alignment in order to mount the support 12 for rotation, while bearings 27, 36 and 28 are also in alignment so as to mount the support 14 for oscillation.

A guide 40 is at the center of frame 16 and consists of a pair of side plates 42 and 44 welded at their lower ends to the cross member 33 and connected in parallel relationship to each other at their upper ends by means of a short plate 46. Diagonal bridging consisting of braces 50, 51, 52 and 53, is welded to the top plate 46 and to the cross members 22 and 24 near their extremities (Figure 1). This causes the frame and the entire fork to be a rigid, unified device.

Support 12 has a group of tines 60 that are approximately and generally semi-circular. Identical tines 62 are on the support 14. A pair of brackets 66 and 67 respectively are welded to the support 12 and protrude radially therefrom. A pair of brackets 68 and 70 respectively are welded to support 14 and also protrude radially therefrom. These pairs of brackets are located on the outer sides of the end bearings 25, 26, 27 and 28 and therefore prevent the excessive end play in the supports 12 and 14. Elongated and flexible supporting members, such as chains 73, 74, 75 and 76, are fastened at their outer ends to the brackets 66, 67, 68 and 70 and are fastened at their inner ends to hooks 80 and 81 at the ends of beam 82. An eye 84 is attached to the center of beam 82 and has a hook 86 engaged with it. This hook is at the end of a chain 88, cable, rope or the like, the opposite end being attached to a lifting implement or device commonly used for lifting forks. By the suspension of the fork 10 in this way the entire weight of the fork and the bale which it lifts is borne by the two sets of brackets on supports 12 and 14 and there is a component of this force tending to oscillate these supports in such direction as to pull the tines 60 and 62 to the tine open position.

Means are operatively connected to the supports 12 and 14 for manually oscillating the supports and pulling the tines 60 and 62 into engagement with the bale such as shown in Figure 5. These manually operable means consist of setting levers 90 and 92 respectively that are welded or otherwise fixed at their inner ends to the supports 12 and 14 respectively. Lever 92 has a bolt 93 extending through an aperture in it and through an aperture in an arm 95 that is also welded to support 14. Bolt 96 passes through apertures in lever 90 and in arm 97 which is fixed to the support 12. Locking arm 99 is pivoted at its inner end to the setting lever 92 while locking arm 100 is pivoted at its inner end to the setting lever 90, these arms being carried by the pivot bolts 93 and 96 respectively. Notches 103 and 162 are formed near the outer extremities of the arms and are adapted to be engaged with latch pin 104 which is passed through and secured to the plates 42 and 44 of guide 40. Setting levers are on the exterior of guide 40 while arms 99 and 100 are disposed in the guide 40.

Means for releasing the arms 99 and 100 from the latched position are connected with them. The preferred means consists of a lever 112 that has one end pivoted on a bracket 114 which protrudes from plate 44. The opposite end of lever 112 has a rope, chain 116 or the like connected to it and entrained around a guide pulley 118. This pulley is supported by a framework 120 that is fixed to the members 50 and 53.

In order to use the fork it is lowered over a bale such as bale B. Setting levers 92 and 90 are manually pulled toward the outside of frame 16 thereby oscillating the supports 12 and 14 in order to bring the tines 60 and 62 into engagement with the opposite sides or ends of the bale B. By pulling the setting levers with sufficient force the locking arms 99 and 100 are latched with pin 104, the notches 162 and 103 being engaged therewith as shown in Figure 5. In this position the bale is firmly held.

Then by lifting upwardly on beam 82 by any standard lifting machine the lifting force is transmitted to the supports 12 and 14 through the brackets that are attached thereto. This lifting force tends to oscillate the supports 12 and 14 in such direction as to separate the tines from the bale B, but the supports do not move since they are latched by arms 99 and 100. After the bale has been moved to the new position, as by being stacked on a truck, a pull on a cable or rope such as at 116 is all that is necessary to separate the bale from the fork. This pulling movement is transmitted to lever 112, the latter being oscillated upwardly and contacting the bottom surfaces of arms 100 and 99 and moving them in a direction so that they separate from pin 104. The weight of the fork 10 being supported by the pairs of brackets on the supports in the manner described previously, causes the supports to oscillate to the position shown in Figure 4 which automatically separates the tines from the bale so that the bale may drop.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fork for handling bales of hay or straw, said fork comprising a pair of spaced tine supports, a frame mounting said supports for oscillation, lifting means connected to said supports to lift said supports and apply an oscillatory force to each of said supports, in a direction which withdraws the tines from each other and from the bale, a setting lever secured to each support to oscillate the supports in a direction to push the tines into the bale, and means carried by said frame and connected with said supports for releasably holding said supports so that said tines are in the bale engaging position.

2. A fork for handling bales of hay or straw, said fork comprising a pair of spaced tine supports, a frame mounting said supports for oscillation, lifting means connected to said supports to lift said supports and apply an oscillatory force to said supports in a direction which withdraws the tines from the bale, a setting lever secured to each support with which to oscillate the supports in a direction to push the tines into the bale, an arm pivoted to each setting lever, and means operatively connected with said arms to hold said arms in a position wherein the tines are penetrated in the bale.

3. A fork for handling bales of hay or straw, said fork comprising a pair of spaced tine supports, a frame mounting said supports for oscillation, lifting means connected to said supports to lift said supports and apply an oscillatory force to said supports in a direction which withdraws the tines from the bale, a setting lever secured to each support with which to oscillate the supports in a direction to push the tines into the bale, an arm pivoted to each setting lever, means connected with said tine supports and frame to releasably hold said arms in a position wherein the tines are penetrated in the bale, and manually operable means for releasing said arms so that said supports are swung by the weight of the frame on said lifting means in a direction to withdraw the tines from the bale.

4. The fork of claim 3 wherein there is a guide for said arms, said guide being carried by said frame, and said manually operable means being pivoted on said guide.

5. In a fork, a pair of parallel supports, tines on each support, a frame having a bearing on opposite sides, said supports being mounted in said bearings for oscillation to two positions to selectively bring the tines into engagement with a load and withdraw the tines therefrom, means carried by said frame and secured to said supports for releasably locking said supports in the said position wherein said tines are in engagement with the load, said means including a pair of levers secured to said supports, a latch pin, means mounting said pin on said frame, arms pivoted to said levers and having notches which are engageable with said latch pin, and means carried by said frame for actuating said arms in a direction to separate the notches of said arms from said latch pin.

6. In a fork, a pair of parallel supports, tines on each support, a frame having a bearing on opposite sides, said supports being mounted in said bearings for oscillation to two positions to selectively bring the tines into engagement with a load and withdraw the tines therefrom, means for releasably locking said supports in the position wherein said tines are in engagement with the load, said means including a pair of setting levers fixed to said supports, arms pivoted to said levers, and means carried by said frame to latch said arms.

7. The fork of claim 6 and manual means connected to said latch means for releasing said arms from said latch means.

8. A fork comprising a pair of parallel elongated supports, tines secured to each support, a frame, bearings secured to said frame, said supports being mounted for oscillation in said bearings, a pair of brackets secured to each support, elongated means secured to each bracket for supporting the supports and for tending to oscillate each of them to the tine open position, setting levers secured to said supports to manually oscillate said supports in the opposite direction to move said supports in the tine closed position, and means connected to said frame to latch said levers and said supports in said closed position.

9. A fork comprising a pair of parallel elongated supports, tines secured to each support, a frame, bearings secured to said frame, said supports being mounted for oscillation in said bearings, a pair of brackets secured to each support, elongated means secured to each bracket for supporting the supports and for tending to oscillate each of them to the tine open position, setting levers secured to said supports to manually oscillate said supports in the opposite direction to move said supports in the tine closed position, means to latch said levers and said supports in said closed position, said lever latching means including a pair of notched arms, there being one arm pivotally attached to each latching lever, a guide having sides and secured to said frame, said arms being passed through and guided by said guide, and a locking pin carried by said guide and adapted to be engaged with the notched arms in such position that the setting levers and supports are arranged such that the tines engage a bale.

10. The fork of claim 9 and an additional lever pivoted to said guide, said lever contacting said notched arms, and means connected to the last mentioned lever for oscillating said lever in such direction as to pivotally operate said notched arms and separate them from locking engagement with said pin.

References Cited in the file of this patent

UNITED STATES PATENTS

| | | |
|---|---|---|
| 2,551,235 | Bates | May 1, 1951 |
| 2,569,760 | Hansen et al. | Oct. 2, 1951 |